(12) United States Patent
Agapov et al.

(10) Patent No.: US 11,456,476 B2
(45) Date of Patent: Sep. 27, 2022

(54) ROLL CONSTRUCTION OF LAMINATED MATERIAL AND METHOD FOR PRODUCING

(71) Applicants: W. L. Gore & Associates, Inc., Newark, DE (US); W. L. Gore & Associates, Co., Ltd., Tokyo (JP)

(72) Inventors: Alexander Agapov, Newark, DE (US); Andrew M. Marlett, Newark, DE (US); Takeyuki Suzuki, Tokyo (JP)

(73) Assignees: W. L. Gore & Associates, Inc, Newark, DE (US); W. L. Gore & Associates G. K., Tokyo (JP)

( * ) Notice: Subject to any disclaimer, the term of this patent is extended or adjusted under 35 U.S.C. 154(b) by 763 days.

(21) Appl. No.: 16/319,080

(22) PCT Filed: Jul. 20, 2017

(86) PCT No.: PCT/US2017/043016
§ 371 (c)(1),
(2) Date: Jan. 18, 2019

(87) PCT Pub. No.: WO2018/017803
PCT Pub. Date: Jan. 25, 2018

(65) Prior Publication Data
US 2021/0328246 A1    Oct. 21, 2021

Related U.S. Application Data

(60) Provisional application No. 62/364,369, filed on Jul. 20, 2016.

(51) Int. Cl.
*H01M 8/1039* (2016.01)
*H01M 8/1053* (2016.01)
(Continued)

(52) U.S. Cl.
CPC ....... *H01M 8/1039* (2013.01); *H01M 8/1053* (2013.01); *H01M 8/1086* (2013.01);
(Continued)

(58) Field of Classification Search
CPC ...................................................... H01M 8/00
See application file for complete search history.

(56) References Cited

U.S. PATENT DOCUMENTS

2012/0021335 A1    1/2012    Sugioka et al.

FOREIGN PATENT DOCUMENTS

| JP | 2009 140920 A | 6/2009 |
|---|---|---|
| JP | 2014 175116 A | 9/2014 |
| JP | 2015 196272 A | 11/2015 |

OTHER PUBLICATIONS

Takahashi. JP 2015 196272A. Nov. 19, 2015. English machine translation by EPO. (Year: 2015).*

(Continued)

*Primary Examiner* — James Lee

(57) ABSTRACT

The present invention relates to a roll construction of laminated material that inhibits delamination of the polymer layer from a backer film upon unwinding of the roll construction. Particularly, aspects of the present invention are directed to a roll construction of laminated material prepared by a process that includes providing the laminated material having an ion-exchange resin layer, a release film, and a base layer, and feeding the laminated material to a roller to generate the roll of the laminated material. The laminated material is fed to the roller such that a first layer of the laminated material wound around the core includes the inner surface of the base layer of the first layer contacting an outer surface of the core.

20 Claims, 8 Drawing Sheets

(51) Int. Cl.
*H01M 8/1086* (2016.01)
*H01M 8/10* (2016.01)
(52) U.S. Cl.
CPC ............... *H01M 2008/1095* (2013.01); *H01M 2300/0082* (2013.01)

(56) References Cited

OTHER PUBLICATIONS

International Search Report and Written Opinion from International Application No. PCT/US2017/043016 dated Nov. 14, 2017.

* cited by examiner

ROLL CONSTRUCTION OF LAMINATED MATERIAL AND METHOD FOR PRODUCING

RELATED APPLICATIONS

The present application is a national phase filing under 35 USC 371 of International Application No. PCT/US2017/043016, entitled "ROLL CONSTRUCTION OF LAMINATED MATERIAL AND METHOD FOR PRODUCING," filed on Jul. 20, 2017, which claims the benefit under 35 U.S.C. § 119(e) of and is a non-provisional of U.S. Provisional Patent Application No. 62/364,369, entitled "ROLL CONSTRUCTION OF LAMINATED MATERIAL AND METHOD FOR PRODUCING," filed on Jul. 20, 2016, the entire disclosure of which are incorporated herein by reference for all purposes.

FIELD OF THE INVENTION

The present invention relates to a roll construction of laminated material including a polymer layer, and in particular to a roll construction of laminated material that inhibits delamination of the polymer layer from a backer film upon unwinding of the roll construction.

BACKGROUND

Polymer layers such as anion, cation, and amphoteric ion exchange membranes are used in a variety of applications. For example, ion exchange membranes are components of polymer electrolyte fuel cells where the ion exchange membranes are located between a cathode and anode, and transport protons formed near a catalyst at a hydrogen electrode to an oxygen electrode thereby allowing a current to be drawn from the polymer electrolyte fuel cells. An ion exchange membrane may also be used in a flow battery such as a redox flow battery to separate two liquid electrolytes contained within the battery. The flow battery is charged and discharged by a reversible reduction-oxidation reaction between the two liquid electrolytes of the battery. Ion exchange (i.e., providing flow of electric current) occurs through the ion exchange membrane while the two liquid electrolytes circulate in their own respective space within the flow battery.

Polymer layers incorporated into fuel cells as well as those employed in chlor-alkali electrolysis cells, diffusion dialysis, electrodialysis, pervaporation, and vapor permeation applications are typically formed on a backer film comprising a release film and a base layer. The release film allows for the polymer layer to be peeled from the backer film at a desired (typically low) peel strength after formation of the polymer layer, i.e., controlled releasability. Once the polymer layer is formed on the backer film to construct the laminated material, the laminated material is typically subjected to a rolling process to create a roll construction of the laminated material that can be stored or shipped to a customer. The traditional roll construction has a layer directionality of the base layer, the release film, and the polymer layer when looking from the outside of the roll construction towards the core of the roll construction, e.g., the polymer layer is on the inner surface of the backer film. Consequently, during unwinding of the traditional roll construction, the polymer layer of a subsequently rolled layer is peeled from the base layer side of the backer film on a previously rolled layer.

However, during the unwinding, the traditional roll constructions can suffer from premature delamination of the polymer layer from the backer film. For example, during unwinding, the polymer layer of a subsequently rolled layer may remain attached to the base layer side of the backer film on a previously rolled layer rather than the polymer layer of the subsequently rolled layer being peeled from the base layer side of the backer film on the previously rolled layer. Accordingly, the need exists for improved techniques for constructing a roll construction that inhibits delamination of the polymer layer from a backer film upon unwinding of the roll construction.

BRIEF SUMMARY

In one embodiment, the invention relates to a roll of laminated material prepared by a process including the steps of: providing the laminated material including an ion-exchange resin layer, a release film, and a base layer; and feeding the laminated material to a roller to generate the roll of the laminated material including a plurality of layers of the laminated material wound around a core. Each layer includes the ion-exchange resin layer having inner and outer surfaces, the release film having inner and outer surfaces, the outer surface of the release film being bonded to the inner surface of the ion-exchange resin layer, and the base layer having inner and outer surfaces, the outer surface of the base layer being bonded to the inner surface of the release film. The laminated material is fed to the roller such that (i) a first layer of the laminated material wound around the core includes the inner surface of the base layer of the first layer contacting an outer surface of the core, and (ii) a second layer of the laminated material wound around the first layer comprises the inner surface of the base layer of the second layer contacting the outer surface of the ion-exchange resin layer from the first layer.

In another embodiment, the invention relates to a process for manufacturing a roll of laminated material including the steps of: binding a fluorine-containing polymer to a backer film comprising a release film and a base layer; coating the fluorine-containing polymer with an ion exchange material to create an ion-exchange resin layer; heating the ion-exchange resin layer and the backer film to create the laminated material; and feeding the laminated material to a roller to generate the roll of the laminated material including a plurality of layers of the laminated material wound around a core. Each layer includes the ion-exchange resin layer having inner and outer surfaces, the release film having inner and outer surfaces, the outer surface of the release film being bonded to the inner surface of the ion-exchange resin layer, and the base layer having inner and outer surfaces, the outer surface of the base layer being bonded to the inner surface of the release film. The laminated material is fed to the roller such that (i) a first layer of the laminated material wound around the core includes the inner surface of the base layer of the first layer contacting an outer surface of the core, and (ii) a second layer of the laminated material wound around the first layer comprises the inner surface of the base layer of the second layer contacting the outer surface of the ion-exchange resin layer from the first layer.

In another embodiment, the invention relates to a roll of laminated material. The roll includes a plurality of layers of the laminated material wound around a core, each layer including: an ion-exchange resin layer having inner and outer surfaces; a release film having inner and outer surfaces, the outer surface of the release film being bonded to the inner surface of the ion-exchange resin layer; and a base layer having inner and outer surfaces, the outer surface of the base layer being bonded to the inner surface of the release film. A first layer of the plurality of layers includes the inner surface of the base layer contacting an outer surface of the core. In some embodiments, a second layer of the plurality of layers includes the inner surface of the base layer contacting the outer surface of the ion-exchange resin layer from the first layer.

Optionally, the release film comprises a cycloolefinic copolymer.

In some embodiments, the ion-exchange resin layer includes an ion exchange material and a fluorine-containing polymer having a sulfonic acid group, a carboxyl group, a phosphoric acid group, or a phosphone group.

In some embodiments, the ion-exchange resin layer includes an ion exchange material and (i) polytetrafluoroethylene or (ii) expanded polytetrafluoroethylene.

In some embodiments, the base layer includes a material selected from the group consisting of polyester, polycarbonate, triacetyl cellulose, polyamide, aromatic polyamide, polyimide, polyetherimide, polyphenylene sulfide, polysulfone, polyethersulfone, polypropylene, and combinations thereof.

Optionally, the base layer includes a polyester selected from the group consisting of polyethylene terephthalate (PET), polyethylene naphthalate (PEN), and polypropylene (PP).

In some embodiments, during the process for manufacturing the roll of laminated material, the laminated material is fed to the roller while maintaining a line speed of about 1.5 to 50.0 m/min.

In some embodiments, during the process for manufacturing the roll of laminated material, the laminated material is fed to the roller while maintaining a line tension of about 100 N to 300 N.

BRIEF DESCRIPTION OF THE DRAWINGS

The present invention will be better understood in view of the following non-limiting figures, in which.

DETAILED DESCRIPTION

I. Introduction

Figure 1A:
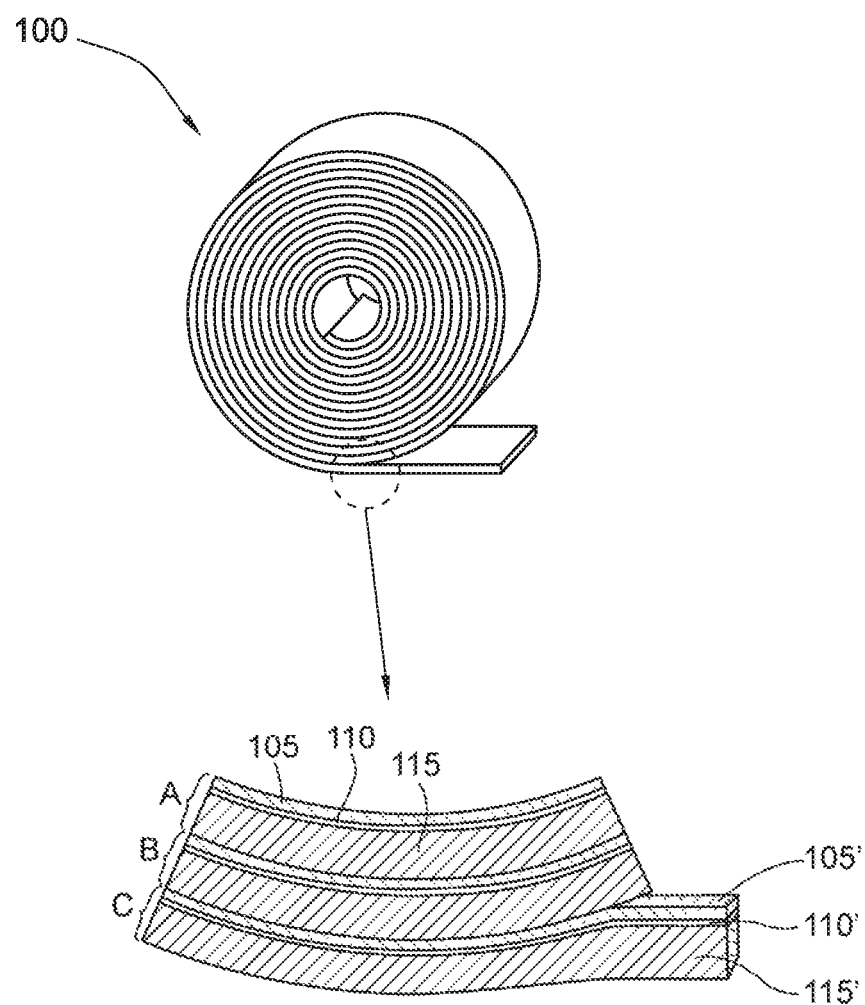
FIGS. 1A and 1B show a tradition roll construction.
Figure 1B:
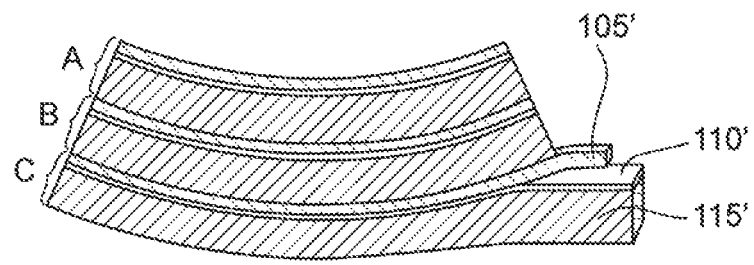

In various embodiments, the present invention is directed to a roll construction of laminated material. One problem associated with a traditional roll construction of laminated material, however, is its reduced ability to maintain lamination, particularly when being unwound after storage or transportation to a customer. FIGS. 1A and 1B illustrate a traditional roll construction 100 comprising three layers (A, B, C). Each layer (A, B, C) comprises a polymer layer 105, a release film 110, and a base layer 115. As shown in FIG. 1A during an ideal traditional unwind process of the roll construction 100, the polymer layer 105' of a subsequently rolled layer (C) should be peeled from the base layer side of the previously rolled layer (B) such that the polymer layer 105' remains laminated to the release film 110' and base layer 115' of rolled layer (C). However, as shown in FIG. 1B during a common traditional unwind process of the roll construction 100, the polymer layer 105' of a subsequently rolled layer (C) becomes delaminated from the release film 110' and remains attached to the base layer side of the previously rolled layer (B). The premature delamination of the polymer layer from the release film complicates the unwind process of the roll construction and can render the polymer layer inadequate for its intended purpose, e.g., use in a flow battery or fuel cell.

Without being bound by theory, one mechanism that may control polymer layer delamination from the backer film upon unwinding of the roll construction is that the polymer layer laminates to the base layer side of the previous layer in the roll construction due to high pressure that develops in the roll construction after winding. For example, the peel strength of the polymer layer from the base layer side of the backer film that is part of a previously rolled layer becomes larger than the peel strength of the same polymer layer from the release film side of the backer film in a subsequent layer after storage or transportation of the roll construction. Consequently, the polymer layer of a subsequently rolled layer remains attached to the base layer side of the backer film on a previously rolled layer rather than the polymer layer of the subsequently rolled layer being peeled from the base layer side of the backer film on the previously rolled layer.

To address these problems, in one embodiment, the present invention is directed to a roll construction of laminated material prepared by a process comprising the steps of providing a laminated material comprising a polymer layer (e.g., an ion-exchange resin layer or membrane), a release film, and a base layer, and feeding the laminated material to a roller to generate the roll of the laminated material comprising a plurality of layers of the laminated material wound around a core. Each layer comprises the polymer layer having inner and outer surfaces, the release film having inner and outer surfaces, the outer surface of the release film being bonded to the inner surface of the polymer layer, the base layer having inner and outer surfaces, and the outer surface of the base layer being bonded to the inner surface of the release film.

The laminated material may be fed to the roller such that (i) a first layer of the laminated material that is wound around the core comprises the inner surface of the base layer of the first layer contacting an outer surface of the core, and (ii) a second layer of the laminated material that is wound around the first layer comprises the inner surface of the base layer of the second layer contacting the outer surface of the ion-exchange resin layer from the first layer. As such, the roll construction prepared in accordance with the aspects of the present invention has a layer directionality of the polymer layer, the release film, and the base layer when looking from the outside of the roll construction towards the core of the roll construction, e.g., the polymer layer is on the outer surface of the backer film. Advantageously, this reverse roll construction orientation is capable of inhibiting delamination of the polymer layer from the backer film upon unwinding of the roll construction for reasons discussed in detail herein.

While some embodiments are disclosed herein with respect to roll constructions comprising two or more layers rolled around a core and a polymer layer that is an ion-exchange resin layer or membrane, this is not intended to be restrictive. In addition to roll constructions having two or more layers (e.g., a first and second layer), the teachings disclosed herein can also be applied to product constructions having any number of layers rolled or stacked upon one another. For example, a roll or stack construction may comprise two, three, four, five or more layers rolled or stacked upon one another. Likewise, the polymer layer is not restricted to an ion-exchange resin layer or membrane. For example, the polymer layer could be other polymeric films such as sulfonated polyether ether ketone (sPEEK).

II. Laminated Material

Figure 2:
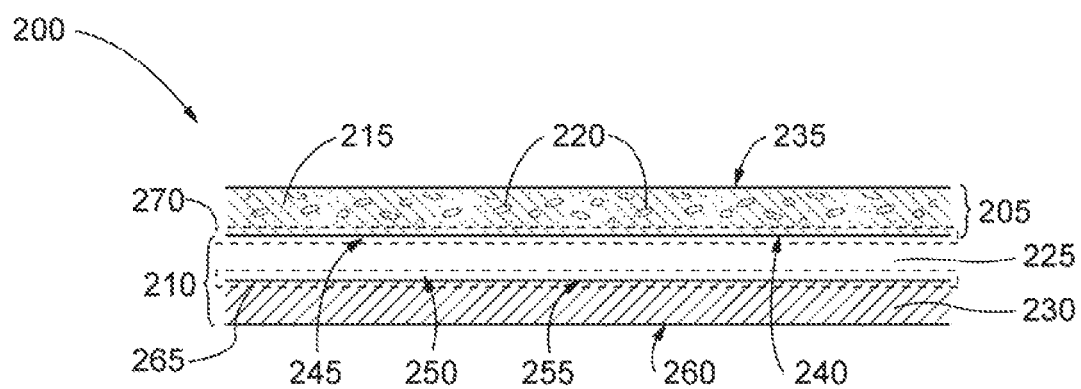
FIG. 2 shows a cross section of a laminated material in accordance with some aspects of the invention.

As shown in FIG. 2, a laminated material 200 is provided that includes a polymer layer 205 and a backer film 210. The polymer layer 205 includes a substrate 215 and an impregnant 220. In various embodiments, the substrate 215 is a porous substrate and the impregnant 220 is a resin, an ion exchange material, or an ion exchange resin. The backer film 210 includes a release film 225 and a base layer 230. The polymer layer 205 comprises a top surface 235 and a bottom surface 240. The release film 225 comprises a top surface 245 and a bottom surface 250. The base layer 230 comprises a top surface 255 and a bottom surface 260. In some embodiments, the release film 225 is formed on the base layer 230 such that an interface 265 is created between the release film 225 and the base layer 230. The interface 265 includes the bottom surface 250 of the release film 225 and the top surface 255 of the base layer 230. Optionally, the interface 265 includes the bottom surface 250 of the release film 225 formed directly on the top surface 255 of the base layer 230 without any intervening structure or material. In some embodiments, the polymer layer 205 is formed on the release film 225 such that an interface 270 is created between the polymer layer 205 and the release film 225. The interface 270 includes the bottom surface 240 of the polymer layer 205 and the top surface 245 of the release film 225. Optionally, the interface 270 includes the bottom surface 240 of the polymer layer 205 formed directly on the top surface 245 of the release film 225 without any intervening structure or material.

In various embodiments, the polymer layer 205 is an ion-exchange resin, an electrolyte membrane, or electrode membrane for a polymer electrolyte fuel cell, or a membrane electrode assembly in which an electrode membrane is joined to both sides of an electrolyte membrane. The substrate 215 maybe a porous polymeric material that includes hydrocarbons such as porous polyolefins. Examples of such porous polyolefins include polyethylene, including ultra-high molecular weight polyethylene (UHMWPE), and polypropylene. Fluoropolymers and/or chlorinated polymers may also be used in accordance with aspects of the present invention. In particular, perfluorinated porous polymeric materials, such as polytetrafluoroethylene (PTFE) or expanded polytetrafluoroethylene (ePTFE), for example, may be used. Other suitable porous polymeric materials include polyamides, polycarbonates, polyacrylates, polysulfones, copolyether esters, polyvinylidene fluoride, polyaryl ether ketones, and polybenzimidazoles. Copolymeric substrates such as, for example, poly(ethylene-co-tetrafluoroethylene) and poly(tetrafluoroethylene-co-hexafluoropropylene), may also be used.

The impregnant 220 may include an ion exchange material. The ion exchange material may be a cation exchange material, an anion exchange material, or an ion exchange material containing both cation and anion exchange capabilities. Mixtures of ion exchange materials may also be employed as impregnates. Suitable ion exchange materials include, for example, perfluorosulfonic acid polymers, perfluorocarboxylic acid polymers, perfluorophosphonic acid polymers, styrenic ion exchange polymers, fluorostyrenic ion exchange polymers, polyarylether ketone ion exchange polymers, polysulfone ion exchange polymers, bis(fluoroalkylsulfonyl)imides, (fluoroalkylsulfonyl)(fluorosulfonyl) imides, polyvinyl alcohol, polyethylene oxides, divinyl benzene, metal salts with or without a polymer, and mixtures thereof.

Optionally, the impregnant 220 further includes a surfactant. The surfactant may be employed with the ion exchange material to ensure impregnation of the interior volume of the porous substrate. Surfactants or surface active agents having a hydrophobic portion and a hydrophilic portion may be utilized. Preferable surfactants are those having a molecular weight of greater than 100 and may be classified as anionic, nonionic, or amphoteric which may be hydrocarbon or fluorocarbon-based and include for example, Merpol®, a hydrocarbon based surfactant or Zonyl®, a fluorocarbon based surfactant, both commercially available from E. I. DuPont de Nemours, Inc. of Wilmington, Del.

In various embodiments, the surfactant is a nonionic material, octylphenoxy polyethoxyethanol having a chemical structure:

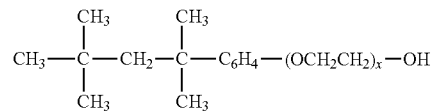

where x=10 (average) known as Triton X-100, commercially available from Rohm & Haas of Philadelphia, Pa.

The impregnant 220 may further include other components, if desired. For example, the impregnant may comprise an electrocatalyst composition. Suitable catalyst compositions include unsupported and supported catalysts comprising precious metals, transition metals, oxides thereof, alloys thereof, and mixtures thereof. The presence of electrocatalyst in the ion exchange layer of the composite membrane may be desirable for reducing reactant crossover, such as, for example, methanol in direct methanol fuel cell applications. Further, the electrocatalyst may provide for more effective ionomer-electrocatalyst interactions, thereby facilitating the oxidation and reduction of reactant gases.

The impregnant 220 may further include electrochemically inert materials that promote water retention in the electrolyte membrane under normal operating conditions. Polymeric, non-polymeric or hydrogel materials may be suitable. For example, the impregnant may further comprise particulate silica and/or fibrous silica, as described in U.S.

Pat. No. 5,523,181, which is incorporated herein by reference, or a hydrogel comprising silicon oxides, such as described in Chemistry of Materials, Vol. 7, pp. 2259-2268 (1995). Other suitable such materials will be apparent to persons skilled in the art.

The impregnant 220 may further include radical scavenging additives like cerium or manganese oxide particles, cerium or manganese salts, or cerium or manganese ions that promote chemical stability of the electrolyte membrane during fuel cell operation.

The impregnant 220 may further include compatible mixtures of non-ionic polymers, such as polyarylether ketones or polysulfones, for example. Having non-ionic polymers in the impregnant may be advantageous in some applications. For example, non-ionic polymers in the impregnant may reduce the amount of methanol cross-over in direct methanol fuel cells.

In embodiments, in which a polymeric composition is used, the impregnant 220 is typically introduced into the porous substrate via an impregnation solution comprising the impregnant in a suitable solvent. The choice of solvent will depend, in part, on both the composition of the impregnant and the composition of the porous substrate. Suitable solvents include, for example, water, ethanol, propanol, butanol, methanol, ketones, carbonates, tetrahydrofuran, acetonitrile N,N-dimethylformamide, N-methylpyrrolidone, dimethylsulfoxide, N,N-dimethylacetamide, and mixtures thereof. As used herein, "solvent" means any suitable solvent or mixture of two or more solvents.

Alternatively, the ion exchange material may include one or more monomers or oligomers that are impregnated into the porous substrate and subsequently polymerized or otherwise chemically linked. Thus, as used herein, "impregnant solution" includes ion exchange monomers, oligomers, polymers, and/or mixtures thereof in solvent, as well as neat ion exchange material monomers and/or oligomers. Note that where the impregnation solution comprises components in addition to the ion exchange material, such components need not be dissolved in the liquid phase. Thus, impregnation solutions may also be dispersions A polymer electrolyte membrane or electrode membrane implemented in accordance with aspects of the present invention is not particularly limited as long as it has high proton (H+) conductivity and electrical insulating properties and also has gas impermeability, and may be a known polymer electrolyte membrane. Typical examples thereof include resins which contain a fluorine-containing polymer as a skeleton and also have a group such as a sulfonic acid group, a carboxyl group, a phosphoric acid group or a phosphone group. Since the thickness of the polymer electrolyte membrane exerts a large influence on resistance, a polymer electrolyte membrane having a smaller thickness is preferred as long as electrical insulating properties and gas impermeability are not impaired, and in some embodiments is within a range from 1 to 100 μm, and preferably from 5 to 20 μm.

The material of the electrolyte membrane in the present invention is not limited to an entirely fluorine-based polymer compound, or may be a mixture of a hydrocarbon-based polymer compound and an inorganic polymer compound, or a partially fluorine-based polymer compound containing both a C—H bond and a C—F bond in the polymer chain. Specific examples of the hydrocarbon-based polyelectrolyte include polyamide, polyacetal, polyethylene, polypropylene, acrylic resin, polyester, polysulfone or polyether, each having an electrolyte group such as a sulfonic acid group introduced therein, and a derivative thereof (aliphatic hydrocarbon-based polymer electrolyte); polystyrene having an electrolyte group such as a sulfonic acid group introduced therein; polyamide, polyamideimide, polyimide, polyester, polysulfone, polyetherimide, polyethersulfone or polycarbonate, each having an aromatic ring, and a derivative thereof (partially aromatic hydrocarbon-based polyelectrolyte); polyether ether ketone having an electrolyte group such as a sulfonic acid group introduced therein; and polyetherketone, polyethersulfone, polycarbonate, polyamide, polyamideimide, polyester or polyphenylene sulfide, and a derivative thereof (entirely aromatic hydrocarbon-based polymer electrolyte). Specific examples of the partially fluorine-based polyelectrolyte include a polystyrene-graft-ethylene tetrafluoroethylene copolymer or a polystyrene-graft-polytetrafluoroethylene, each having an electrolyte group such as a sulfonic acid group introduced therein, and a derivative thereof. Specific examples of the entirely fluorine-based polymer electrolyte film include Nation® film (manufactured by DuPont), Aciplex® film (manufactured by Asahi Kasei Corporation) and Flemion® film (manufactured by Asahi Glass Co., Ltd.), each being made of perfluoropolymers having a sulfonic acid group in the side chain. The inorganic polymer compound may be a siloxane-based or silane-based organic silicon polymer compound, and in particular an alkylsiloxane-based organic silicon polymer compound, and specific examples thereof include polydimethylsiloxane and γ-glycidoxypropyitrimethoxysilane. It is also possible to use, as the polymer electrolyte membrane, GORE-SELECT® (manufactured by JAPAN GORE-TEX INC.) which is a reinforced type solid polymer electrolyte membrane obtained by impregnating a porous expanded polytetrafluoroethylene membrane with a proton-conductive resin.

In various embodiments, the release film 225 includes a cycloolefinic copolymer. A cycloolefinic copolymer refers to an olefin-based copolymer obtained by copolymerizing at least one kind of a cyclic olefin. Specific examples of the cyclic olefin include cyclopentene, cyclohexene and cyclooctene; monocyclic olefin such as cyclopentadiene or 1,3-cyclohexadiene; dicyclic olefin such as bicyclo[2.2.1]hepta-2-ene (common name: norbornene), 5-methyl-bicyclo[2.2.1]hepta-2-ene, 5,5-dimethyl-bicyclo[2.2.1]hepta-2-ene, 5-ethyl-bicyclo[2.2.1]hepta-2-ene, 5-butyl-bicyclo[2.2.1]hepta-2-ene, 5-ethylidene-bicyclo[2.2.1]hepta-2-ene, 5-hexyl-bicyclo[2.2.1]hepta-2-ene, 5-octyl-bicyclo[2.2.1]hepta-2-ene, 5-octadecyl-bicyclo[2.2.1]hepta-2-ene, 5-methylidyne-bicyclo[2.2.1]hepta-2-ene, 5-vinyl-bicyclo[2.2.1]hepta-2-ene or 5-propenyl-bicyclo[2.2.1]hepta-2-ene; tricyclo[4.3.0.1$^{2,5}$]deca-3,7-diene (common name: dicyclopentadiene) or tricyclo[4.3.0.1$^{2,5}$]deca-3-ene; tricyclo[4.4.0.1$^{2,5}$]undeca-3,7-diene or tricyclo[4.4.0.1$^{2,5}$]undeca-3,8-diene, or tricyclo[4.4.0.1$^{2,5}$]undeca-3-ene which is a partially hydrogenated product (or an adduct of cyclopentadiene and cyclohexene) thereof; tricyclic olefin such as 5-cyclopentyl-bicyclo[2.2.1]hepta-2-ene, 5-cyclohexyl-bicyclo[2.2.1]hepta-2-ene, 5-cyclohexenylbicyclo[2.2.1]hepta-2-ene or 5-phenyl-bicyclo[2.2.1]hepta-2-ene; tetarcyclic olefin such as tetracyclo[4.4.0.1$^{2,5}$1$^{7,10}$]dodeca-3-ene (sometimes referred to as tetracyclododecene), 8-methyitetracyclo[4.4.0.1$^{2,5}$1$^{7,10}$]dodeca-3-ene, 8-ethyltetracyclo[4.4.0.1$^{2,5}$1$^{7,10}$]dodeca-3-ene, 8-methylidenetetracyclo[4.4.0.1$^{2,5}$1$^{7,10}$]dodeca-3-ene, 8-ethylidenetetracyclo[4.4.0.1$^{2,5}$1$^{7,10}$]dodeca-3-ene, 8-vinyltetracyclo[4.4.0.1$^{2,5}$1$^{7,10}$]dodeca-3-ene or 8-propenyl-tetracyclo[4.4.0.1$^{2,5}$1$^{7,10}$]dodeca-3-ene; 8-cyclopentyl-tetracyclo[4.4.0.1$^{2,5}$1$^{7,10}$]dodeca-3-ene, 8-cyclohexyl-tetracyclo[4.4.0.1$^{2,5}$1$^{7,10}$]dodeca-3-ene, 8-cyclohexenyl-tetracyclo[4.4.0.1$^{2,5}$1$^{7,10}$]dodeca-3-ene or 8-phenyl-cyclopentyl-tetracyclo[4.4.0.1$^{2.5}$1$^{7.10}$]dodeca-3-ene; tetracyclo[7.4.1$^{3.6}$.0$^{1.9}$.0$^{2.7}$]tetradeca-4,9,11,13-tetraene (sometimes referred to as 1,4-methano-1,4,4a,9a-tetrahydrofluorene) or tetracyclo[8.4.1$^{4.7}$.0$^{1.10}$.0$^{3.8}$]pentadeca-5,10,12,14-tetraene (sometimes referred to as 1,4-methano-1,4,4a,5,10,10a-hexahydroanthracene); pentacyclo[6.6.1.1$^{3.6}$.0$^{2.7}$.0$^{9.14}$]-4-hexadecene, pentacyclo[6.5.1.1$^{3.6}$.0$^{2.7}$.0$^{9.13}$]-4-pentadecene or pentacyclo[7.4.0.0$^{2.7}$.1$^{3.6}$.1$^{10.13}$]-4-pentadecene; heptacyclo[8.7.0.1$^{2.9}$.1$^{4.7}$.1$^{11.17}$.0$^{3.8}$.0$^{12.16}$]-5-eicosene or heptacyclo[8.7.0.1$^{2.9}$.0$^{3.8}$.1$^{4.7}$.0$^{12.17}$.1$^{13.16}$]-14-eicosene; and polycyclic olefin such as a tetramer of cyclopentadiene. These cyclic olefins can be used alone, or two or more kinds of them can be used in combination.

The olefin to be copolymerized with the cyclic olefin in certain embodiments is α-olefin, and specific examples thereof include ethylene or α-olefin having 2 to 20 carbon atoms, and preferably 2 to 8 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene or 1-eicosene. These α-olefins can be used alone, or two or more kinds of them can be used in combination. In the present invention, particularly preferable α-olefin is ethylene.

There is no particular limitation on the method of polymerization of a cyclic olefin with α-olefin, and the polymerization can be conducted in accordance with a known method. The cycloolefinic copolymer to be used in the release film of the present invention may be an addition copolymer of ethylene and norbornene, which is commercially available from Polyplastics Co., Ltd. as TOPAS®. In the addition copolymer of ethylene and norbornene, it is possible to obtain a high glass transition temperature (Tg) by increasing a molar fraction of norbornene. The Tg of the cycloolefinic copolym in certain embodiments is 50° C. or higher, preferably 100° C. or higher, more preferably 120° C. or higher, and most preferably 160° C. or higher. As Tg becomes higher, retention of a film shape at a high temperature and releasability are excellent. In contrast, when Tg is too high, it is difficult to carry out a forming process. When a heat treatment is applied in the case of laminating the layer containing an ion-exchange resin to form a laminate, it is preferable to employ a cycloolefinic copolymer having Tg higher than the temperature of the heat treatment. The upper limit of Tg of a common cycloolefinic copolymer is about 250° C. Two or more kinds of cycloolefinic copolymers each having different Tg may be used in combination.

In some embodiments, a method of forming the release film 225 includes a melt-extrusion method using a T-die. As shown in FIG. 2, it is possible to employ (i) a method of laminating the release film 225 of a cycloolefinic copolymer formed by the above melt-extrusion method on the base layer 230, or (ii) a method of coating a solution of a cycloolefinic copolymer on the base layer 230 (e.g., a solution flow casting method). The release film 225 may be formed having a thickness in the range from 0.05 to 1.0 µm, and preferably from 0.1 to 0.5 µm. However, it should be understood to those skilled in the art that the thickness of the release film 225 can be appropriately set taking expected releasability, handling properties, and material costs of the laminate into consideration. Regarding details of a method of forming a film of a cycloolefinic copolymer by a melt-extrusion method and a solution flow casting method, refer to Japanese Unexamined Patent Publication (Kokai) No. 2007-112967, which is incorporated herein in its entirety.

In various embodiments, the ion-exchange resin is an electrolyte membrane or electrode membrane for a polymer electrolyte fuel cell, or a membrane electrode assembly in which an electrode membrane is joined to both sides of an electrolyte membrane. The electrolyte membrane is not particularly limited as long as it has high proton (H+) conductivity and electrical insulating properties and also has gas impermeability, and may be a known polymer electrolyte membrane. Typical examples thereof include resins which contain a fluorine-containing polymer as a skeleton and also include a group such as a sulfonic acid group, a carboxyl group, a phosphoric acid group or a phosphone group. Since the thickness of the polymer electrolyte membrane exerts a large influence on resistance, a polymer electrolyte membrane having a smaller thickness is required as long as electrical insulating properties and gas impermeability are not impaired, and is specifically set within a range from 1 to 100 µm, and preferably from 5 to 20 µm. The material of the polymer electrolyte membrane in the present invention is not limited to an entirely fluorine-based polymer compound, or may be a mixture of a hydrocarbon-based polymer compound and an inorganic polymer compound, or a partially fluorine-based polymer compound containing both a C—H bond and a C—F bond in the polymer chain.

Specific examples of the hydrocarbon-based polyelectrolyte include polyamide, polyacetal, polyethylene, polypropylene, acrylic resin, polyester, polysulfone or polyether, each having an electrolyte group such as a sulfonic acid group introduced therein, and a derivative thereof (aliphatic hydrocarbon-based polymer electrolyte); polystyrene having an electrolyte group such as a sulfonic acid group introduced therein; polyamide, polyamideimide, polyimide, polyester, polysulfone, polyetherimide, polyethersulfone or polycarbonate, each having an aromatic ring, and a derivative thereof (partially aromatic hydrocarbon-based polyelectrolyte); polyether ether ketone having an electrolyte group such as a sulfonic acid group introduced therein; and polyetherketone, polyethersulfone, polycarbonate, polyamide, polyamideimide, polyester or polyphenylene sulfide, and a derivative thereof (entirely aromatic hydrocarbon-based polymer electrolyte). Specific examples of the partially fluorine-based polyelectrolyte include a polystyrene-graft-ethylene tetrafluoroethylene copolymer or a polystyrene-graft-polytetrafluoroethylene, each having an electrolyte group such as a sulfonic acid group introduced therein, and a derivative thereof. Specific examples of the entirely fluorine-based polymer electrolyte film include Nation® film (manufactured by DuPont), Aciplex® film (manufactured by Asahi Kasei Corporation) and Flemion® film (manufactured by Asahi Glass Co., Ltd.), each being made of perfluoropolymers having a sulfonic acid group in the side chain. The inorganic polymer compound may be a siloxane-based or silane-based organic silicon polymer compound, and in particular an alkylsiloxane-based organic silicon polymer compound, and specific examples thereof include polydimethylsiloxane and γ-glycidoxypropyitrimethoxysilane. It is also possible to use, as the polymer electrolyte membrane, GORE-SELECT® (manufactured by W. L. Gore & Associates, Co., Ltd, Japan) which is a reinforced type solid polymer electrolyte membrane obtained by impregnating a porous expanded polytetrafluoroethylene membrane with a proton-conductive resin.

In various embodiments, the base layer 230 is made of a material comprising polyester, polycarbonate, triacetyl cellulose, polyamide, aromatic polyamide, polyimide, polyetherimide, polyphenylene sulfide, polysulfone, polyethersulfone, polypropylene, and combinations thereof. A polyester such as polyethylene terephthalate (PET), polyethylene naphthalate (PEN), or polypropylene (PP) is particularly preferable in view of heat resistance and mechanical characteristics. In some embodiments, the thickness of the base layer is within a range from 10 to 110 μm, and preferably from 15 to 60 μm, taking transportation properties and handling properties of the laminated material into consideration.

In alternative embodiments, the backer film 210 is a reflective substrate, as described in U.S. Provisional Patent Application No. 62/307,261 filed Mar. 11, 2016, which is incorporated herein in its entirety. The reflective substrate can be removably coupled or removably adhered to the polymer layer 205 to form the laminated material 200. In some embodiments, a reflective layer of the reflective substrate can be attached to the polymer layer 205 to couple or adhere the reflective substrate to the polymer layer 205. In another example, a carrier layer of the reflective substrate can be attached to the polymer layer 205 to couple or adhere the reflective substrate to the polymer layer 205. The reflective substrate can cover the polymer layer 205 and reflect or absorb at least a portion of electromagnetic radiation transmitted toward or traversing the polymer layer 205.

The reflective substrate optionally includes a metal substrate (e.g., an elemental aluminum substrate). The specific metal chosen may vary widely so long as it is reflective. A non-limiting list of exemplary metals includes: aluminum, beryllium, chromium, copper, germanium, gold, hafnium, molybdenum, nickel, platinum, rhodium, silver, tantalum, titanium, tungsten, zinc, or alloys such as Inconel, bronze. The reflective substrate optionally comprises a mixture or alloy of two or more metals, optionally two or more of the metals listed above. The reflective substrate optionally can include a high reflectivity polymeric multilayer film such as Vikuiti™ Enhanced Specular Reflector available from 3M company. In yet another example, the reflective substrate optionally can include a high reflectivity non-metal inorganic dielectric multilayer film comprised of materials such as, for example, magnesium fluoride, calcium fluoride, titanium dioxide, silicon dioxide. In some aspects, the reflective substrate includes a reflective layer and a carrier layer. The reflective layer can include a metal substrate (e.g., aluminum) or a high reflectivity non-metal multilayer film, and the carrier layer can include polyethylene ("PE"), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), polycarbonate ("PC"). In some aspects, the reflective substrate also includes a protective layer, which can include a polyethylene (PE), polystyrene ("PS"), cyclic olefin copolymer ("COC"), cyclic olefin polymer ("COP"), fluorinated ethylene propylene ("FEP"), perfluoroalkoxy alkanes ("PFAs"), ethylene tetrafluoroethylene ("ETFE"), polyvinylidene fluoride ("PVDF"), polyetherimide ("PEI"), polysulfone ("PSU"), polyethersulfone ("PES"), polyphenylene oxide ("PPO"), polyphenyl ether ("PPE"), polymethylpentene ("PMP"), polyethyleneterephthalate ("PET"), or polycarbonate ("PC").

III. Roll Construction

Figure 3A:
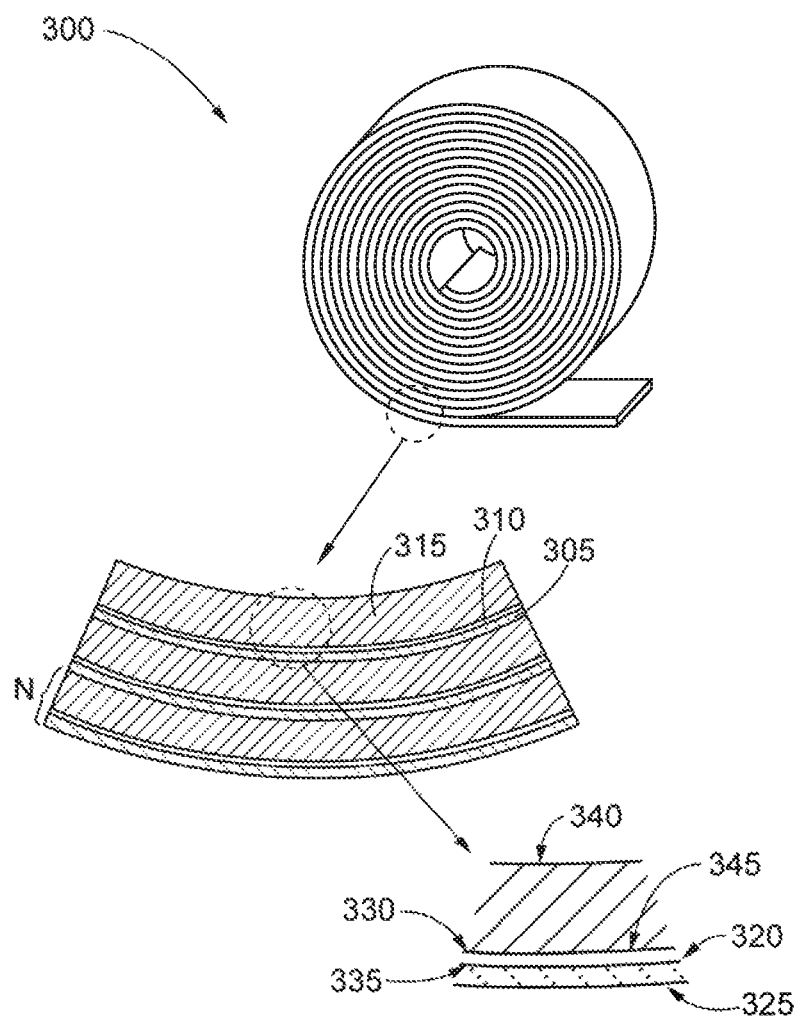
FIG. 3A shows a reverse roll construction in accordance with some aspects of the invention.

As shown in FIG. 3A, a roll construction 300 is provided that includes a plurality of layers (A, B, C, . . . N) of laminated material (e.g., laminated material 200 as described with respect to FIG. 2). Each layer (A, B, C, . . . N) comprises a polymer layer 305 (e.g., the polymer layer 205 as described with respect to FIG. 2), a release film 310 (e.g., the release film 225 as described with respect to FIG. 2), and a base layer 315 (e.g., the base layer 230 as described with respect to FIG. 2). The polymer layer 305 comprises an inner surface 320 and an outer surface 325. The release film 310 comprises an inner surface 330 and an outer surface 335. The base layer 315 comprises an inner surface 340 and an outer surface 345. In some embodiments, the layer (A) of the laminated material wound around a core 350 comprises the inner surface 340''' of the base layer 315''' of the layer (A) contacting an outer surface 355 of the core 350 (e.g., a core rod). The layer (B) of the laminated material wound around the layer (A) comprises the inner surface 340" of the base layer 315" of the layer (B) contacting the outer surface 325''' of the polymer layer 305''' from the layer (A). The layer (C) of the laminated material wound around the layer (B) comprises the inner surface 340' of the base layer 315' of the layer (C) contacting the outer surface 325" of the polymer layer 305" from the layer (B).

Figure 3B:
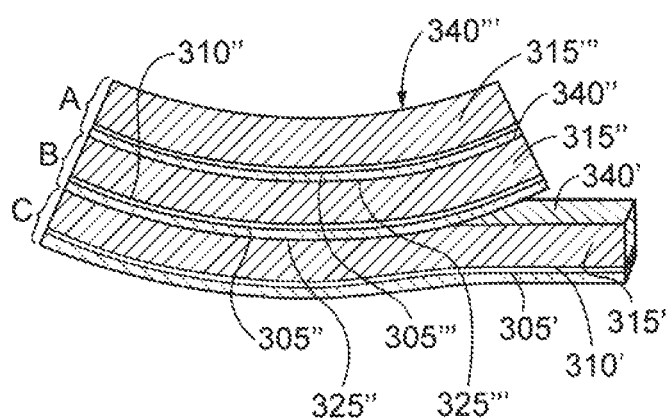
FIG. 3B shows an unwind process of the roll construction illustrated in FIG. 3A in accordance with some aspects of the invention.

As shown in FIG. 3B during an unwind process of the roll construction 300, the base layer 315' of a subsequently rolled layer (C) is peeled from the polymer layer side of the previously rolled layer (B) such that the polymer layer 305" remains laminated to the release film 310" and base layer 315" of rolled layer (B). Additionally, the base layer 315' of the subsequently rolled layer (C) remains attached to the release film 310' and the polymer layer 305'. Advantageously, this reverse roll construction orientation is capable of inhibiting delamination of the polymer layer from the backer film upon unwinding of the roll construction for reasons discussed in detail herein.

IV. Method for Constructing a Roll Construction

Figure 4:
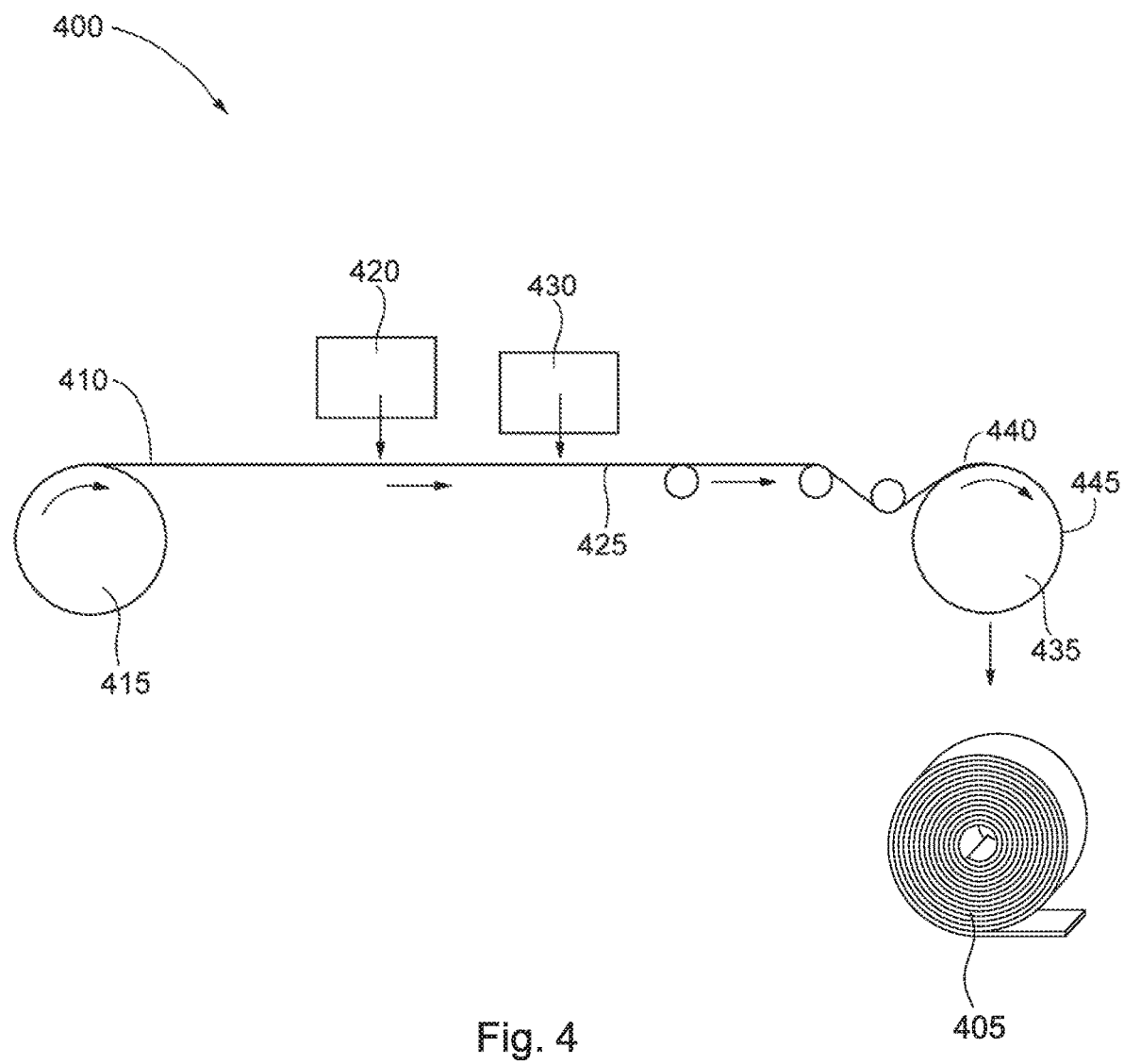
FIG. 4 shows an exemplary flow for a process of manufacturing a reverse roll construction in accordance with some aspects of the invention.

As shown in FIG. 4, a process 400 for constructing a roll construction 405 (e.g., roll construction 300 as described with respect to FIG. 3A) is provided that includes providing a backer film 410 that includes the release film formed on a top surface of a base layer. In some embodiments, the backer film 410 is provided by unwinding a previously produced roll of backer film from an unwinding roller 415. In alternative embodiments, the base layer can be unwound from a previously produced roll of base layer from an unwinding roller (not shown), and the release film can be formed on a top surface of the base layer, as described herein, to provide the backer film 410.

The process 400 further includes forming a polymer layer 420 on a top surface of the backer film 410 to create a laminated material 425 (e.g., laminated material 200 as described with respect to FIG. 2). In some embodiments, the polymer layer 420 is formed by coating a solution of polymer and impregnant (e.g., an ion-exchange resin) on the top surface of the backer film, and removing the solvent by drying using a heater 430. For example, when the polymer layer 420 is an ion-exchange resin or an electrolyte membrane for a polymer electrolyte fuel cell, an electrolyte solution such as a commercially available Nafion® solution may be coated on the top surface of the backer film, followed by drying the laminated material 425 using the heater 430. In alternative embodiments, the polymer layer 420 is formed by binding or hot-pressing a solid polymer membrane such as fluorine-containing polymer made separately to the release film using a binder such as a hot press (not shown). Subsequently, the solid polymer membrane is coated with a solution of impregnant on the top surface of the polymer layer, and the solvent is removed by drying the laminated material 425 using the heater 430. For example, when the polymer layer 420 is an ion-exchange resin or a membrane assembly for a polymer electrolyte fuel cell, a solid polymer membrane is joined to the backer film by the hot press, and the solid polymer membrane is impregnated with the impregnant by coating the solid polymer layer with an impregnant solution and drying the resultant laminated material. The thickness of the polymer layer 420 can be adjusted to a certain thickness by adjusting the concentration of the solution of the polymer and/or the impregnant and repeating coating and drying steps of the polymer and/or the impregnant solution. The thickness of the laminated material 425 is within the range of 11 µm-210 µm, preferably within the range of 20 µm -80 µm.

The process 400 further includes feeding the laminated material 425 to a roller 435 in order to construct the roll construction 405 comprising a plurality of layers of the laminated material 425 wound around a core (e.g., a core rode). A first end 440 of the laminated material 425 may be fed to the outer surface 445 of the core of the roller 435 while maintaining a line tension of about 100 N to 300 N (where about is +/-2 N), preferably about 190 N to 200 N, for example about 196 N. Additionally, the first end 440 of the laminated material 425 may be fed to the outer surface 445 of the core of the roller 435 while maintaining a line speed of about 1.0 to 50.0 m/min (where about is +/-0.3 m/min), preferably about 2.0 to 15.0 m/min, more preferably about 2.5 to 7.5 m/min, for example about 3.0 m/min.

In some embodiments, the first end 440 of the laminated material 425 is fed to the outer surface 445 of the core of the roller 435 that is rotating in a clockwise or counterclockwise direction such that (i) a first layer of the laminated material 425 wound around the core comprises the inner surface of the base layer of the first layer contacting an outer surface of the core, and (ii) a second layer of the laminated material 425 wound around the first layer comprises the inner surface of the base layer of the second layer contacting the outer surface of the ion-exchange resin layer from the first layer. For example, an inner surface of the backer film 410 (e.g., the inner surface of the base layer) is wound directly around the outer surface 445 of the roller 435. Successive rotations of the roller 435 in the clockwise or counter clockwise direction result in the inner surface of the backer film 410 (e.g., the inner surface of the base layer) being wound directly around the outer surface of the polymer layer 420 of the previous layer wrapped around the core of the roller 435. As such, the roll construction 405 prepared in accordance with the aspects of the present invention has a layer directionality of the polymer layer, the release film, and the base layer when looking from the outside of the roll construction 405 towards the core of the roll construction 405, e.g., the polymer layer is on the outer surface of the backer film. Advantageously, this reverse roll construction orientation is capable of inhibiting delamination of the polymer layer from the backer film upon unwinding of the roll construction for reasons discussed in detail herein.

V. Test Procedure

Figure 5:
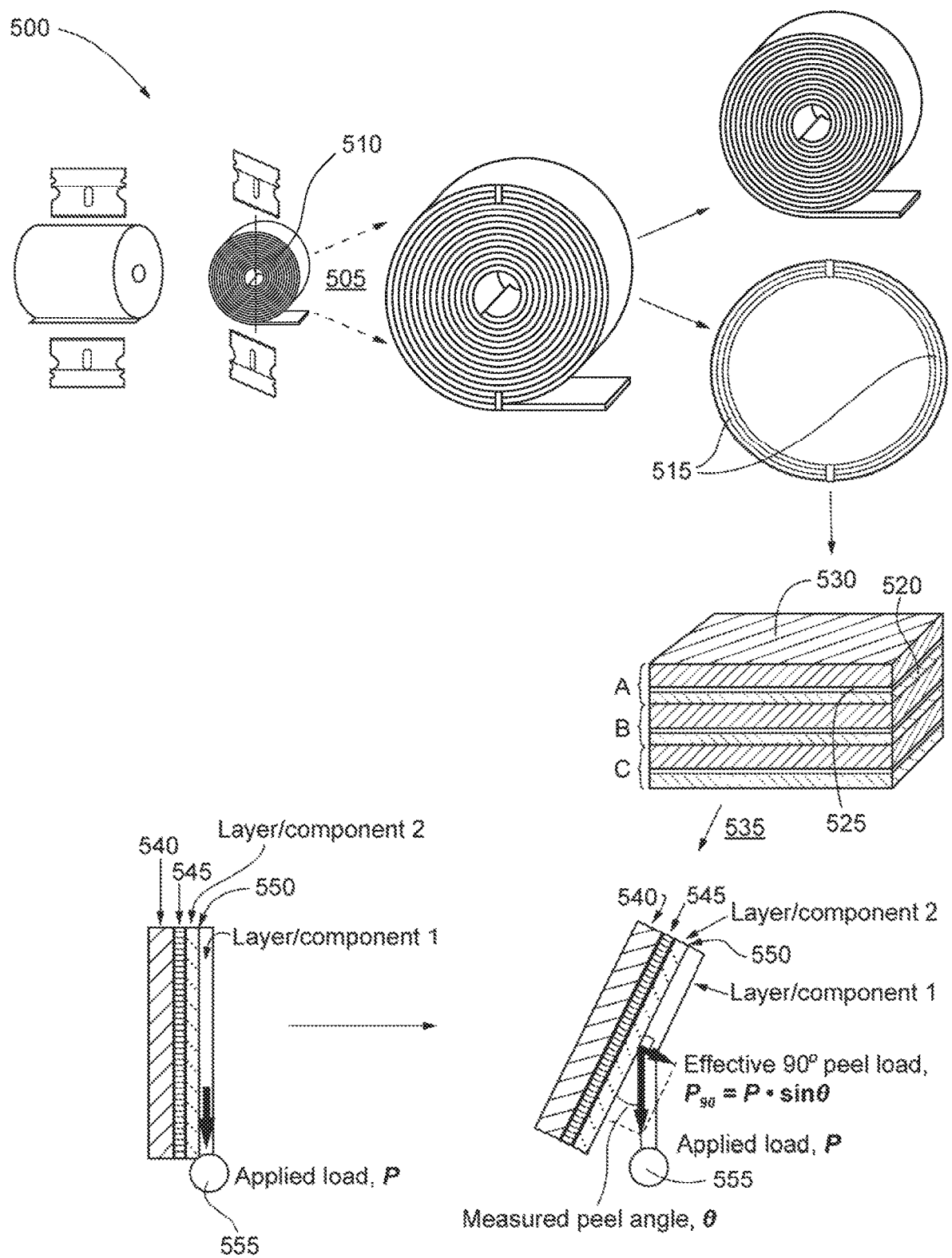
FIG. 5 shows an exemplary flow for a peel test procedure in accordance with some aspects of the invention.

The following peel test procedure was employed on samples of rolled laminated material which were prepared in accordance with aspects of the present invention (see, e.g., FIGS. 2-4). As shown in FIG. 5, the peel test procedure 500 includes a step 505 of cutting into a roll construction 510 (e.g., roll construction 300 as described with respect to FIG. 3A and constructed as described with respect to FIG. 4) from opposites sides. The cut should be about 0.5 mm deep. The resultant sheets 515 comprise multiple layers (A, B, C) of laminated material. Each layer (A, B, C) comprises a polymer layer 520 formed on a outer surface of a release film 525, and the release film 525 formed on an outer surface of a base layer 530.

The peel test procedure 500 further includes a step 535 of measuring peel strength between the multiple layers (A, B, C) and between the individual components (e.g., the polymer layer 520, the release film 525, and the base layer 530) of each layer (A, B, C). Firstly, a sheet containing multiple layers (A, B, C) of laminated material were cut into strips containing multiple layers (A, B, C) of laminated material that were 10 mm in width and 150 mm length. These strips containing multiple layers (A, B, C) of laminated material were then attached to a smooth glass substrate 540 via double sided adhesive tape 545. Secondly, the interface 550 between desired layers (A, B, C) or between the individual components (e.g., the polymer layer 520, the release film 525, and the base layer 530) of each layer (A, B, C) were then pre-peeled for about 20 mm of the strip length in order to attach a load 555 and to initiate the peel at the interface. The subsequent peel tests were performed by tilting the glass substrate 540 with the attached pre-peeled strip of layers (A, B, C) of laminated material until the desired layer/component was peeling from subsequent layer/component at a constant steady rate as depicted in FIG. 5. During all peel tests the peel rate was kept below 20 cm/min and the applied load P was constant and kept at the same level of 0.30 N for all tests. The peel angle Θ defined as the angle between the layer/component of interest and the subsequent layer/component at which the peel proceeded at a constant steady rate was measured and recorded. The effective 90° peel load $P_{90}$ was calculated as a product of applied load and the sine of measured peel angle: $P_{90}=P \cdot \sin \theta$. Such peel measurements were performed at least twice for every test of interest to insure reproducibility. Peel strength was then calculated as the ratio of average effective 90° peel load $P_{90}$ and unit width of the layer/component of bond line.

VI. Examples

Without intending to limit the scope of the present invention, the apparatus and method of production of the present invention may be better understood by referring to the following examples.

Example 1 (Traditional Roll Construction)

A 30 meter long web of 11.5 µm GORE-SELECT® (manufactured by W. L. Gore & Associates, Co., Ltd, Japan) on a backer film (e.g., a laminated material) was wound into a traditional roll construction. For example, a first end of the laminated material was fed to an outer surface of the core of a roller that was rotating in a clockwise or counterclockwise direction such that (i) a first layer of the laminated material wound around the core comprises the inner surface of the polymer layer of the first layer contacting an outer surface of the core, (ii) a second layer of the laminated material wound around the first layer comprises the inner surface of the polymer layer of the second layer contacting the outer surface of base layer from the first layer, and (iii) a third layer of the laminated material wound around the second layer comprises the inner surface of the polymer layer of the third layer contacting the outer surface of base layer from the second layer. This traditional roll construction was subjected to storage in an oven at 90° C. for 24 hours. Thereafter, the traditional roll construction was cooled to room temperature, and sheets made of multiple layers of GORE-SELECT® (manufactured by W. L. Gore & Associates, Co., Ltd, Japan) on a backer film were processed in accordance with the peel test procedure 500 described herein with respect to FIG. 5.

The 90 degree peel strength test at a first interface (between the outer surface of the base layer of the first layer and the inners surface of the polymer layer of the second layer) and a second interface (between the outer surface of the polymer layer of the second layer and an inner surface of the release film of the second layer) was measured. The peel strengths at the interfaces of interest were measured for the sheets that comprise multiple layers (A, B, C) of laminated material cut out from the above described traditional roll simulating the peel geometries that would be observed for traditional and reverse rolls, as depicted in FIGS. 6A, 6B, 7A, and 7B. These simulations of peel at interfaces of interest as they would be observed in traditional and reverse rolls were performed on the samples cut from the same sheet obtained from the above described traditional roll in order to eliminate any potential differences between rolls (influence of their aging history or manufacturing nuances on peel strength) and to demonstrate the beneficial effect of peel geometry inherently observed during reverse roll unwinding on decreasing the likelihood of delamination.

Figure 6A:
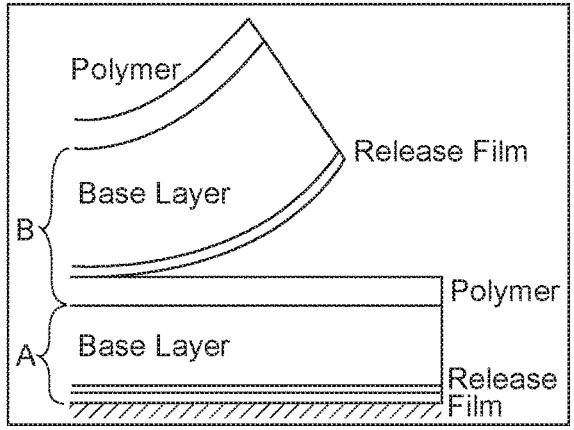
FIGS. 6A and 6B show a peel experiment simulating unwind of a traditional roll construction in accordance with some aspects of the invention.
Figure 7A:
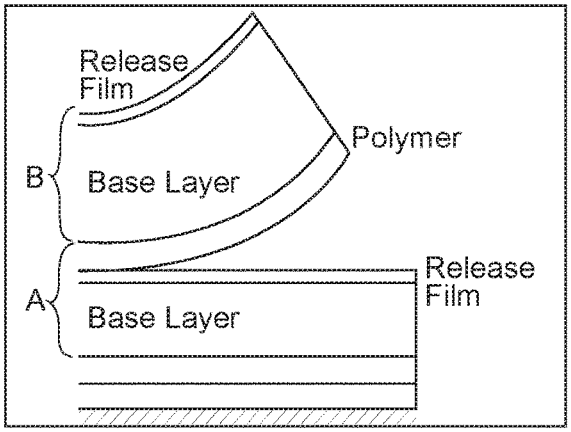
FIGS. 7A and 7B show a peel experiment simulating unwind of a reverse roll construction in accordance with some aspects of the invention.
Figure 6B:
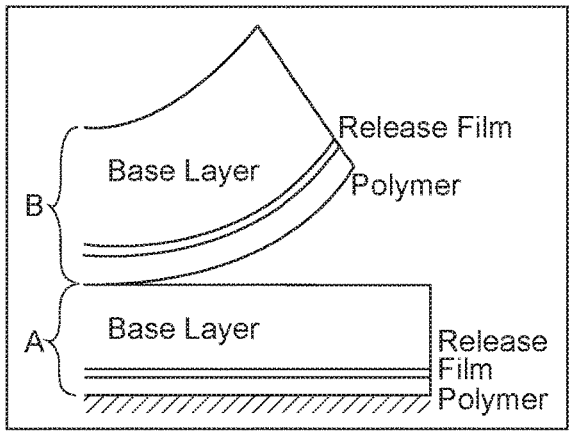
Figure 7B:
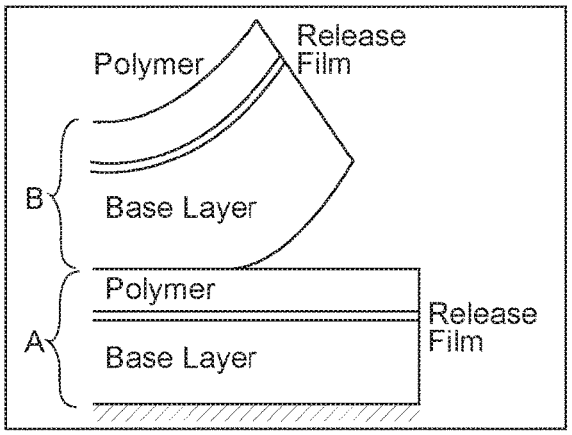

As shown in FIG. 6A, simulating unwind of the traditional roll construction, the polymer layer of the second layer (B) stayed adhered to the base layer side of the adjacent first layer (A) and was peeled from the release film side of the second layer (B). The peel test performed according to FIG. 6A tested the peel strength between the polymer layer and the release film of the second layer (B) as it would be observed during the unwind of a traditional roll, i.e., "traditional" peel direction for polymer/release film interface. As shown in FIG. 6B, simulating unwind of the traditional roll construction, the polymer layer of the second layer (B) stayed adhered to the release film side of the second layer (B) and was peeled from the base layer side of the adjacent first layer (A). The peel test performed according to FIG. 6B tested the peel strength between the polymer layer and the base layer of adjacent layers (A and B) as it would be observed during the unwind of traditional roll, i.e. "traditional" peel direction for polymer/base layer interface. As shown in FIG. 7A, simulating unwind of the reverse roll construction, the polymer layer of the first layer (A) stayed adhered to the base layer side of the adjacent second layer (B) and was peeled from the release film side of the first layer (A). The peel test performed according to FIG. 7A tested the peel strength between the polymer layer and the release film of the first layer (A) as it would be observed during the unwind of a reverse roll, i.e. "reverse" peel direction for polymer/release film interface. As shown in FIG. 7B, simulating unwind of the reverse roll construction, the polymer layer of the first layer (A) stayed adhered to the release film side of the first layer (A) and was peeled from the base layer side of the adjacent second layer (B). The peel test performed according to FIG. 7B tested the peel strength between the polymer layer and the base layer of adjacent layers (A and B) as it would be observed during the unwind of reverse roll, i.e. "reverse" peel direction for polymer/base layer interface.

Figure 8A:
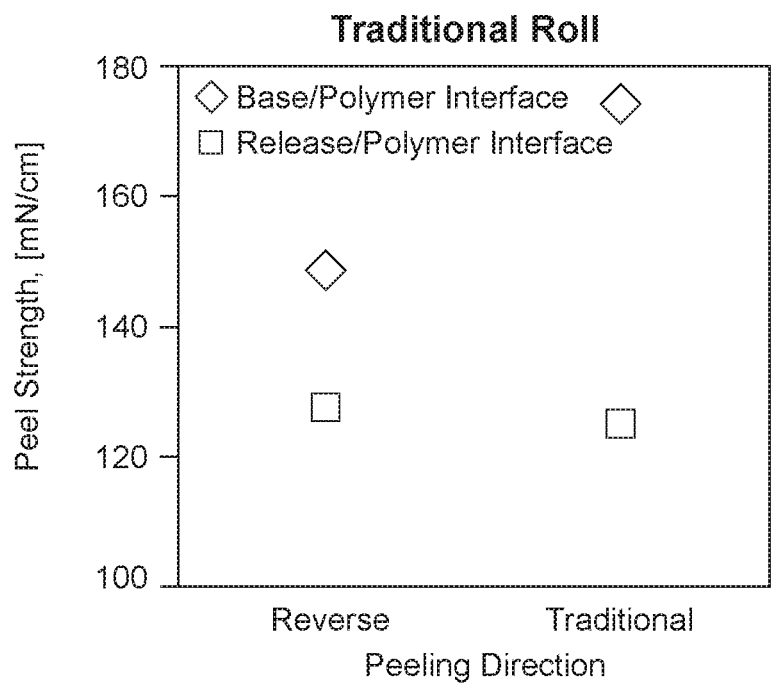
FIGS. 8A and 8B show peel strength data for a traditional roll construction in accordance with some aspects of the invention.
Figure 8B:
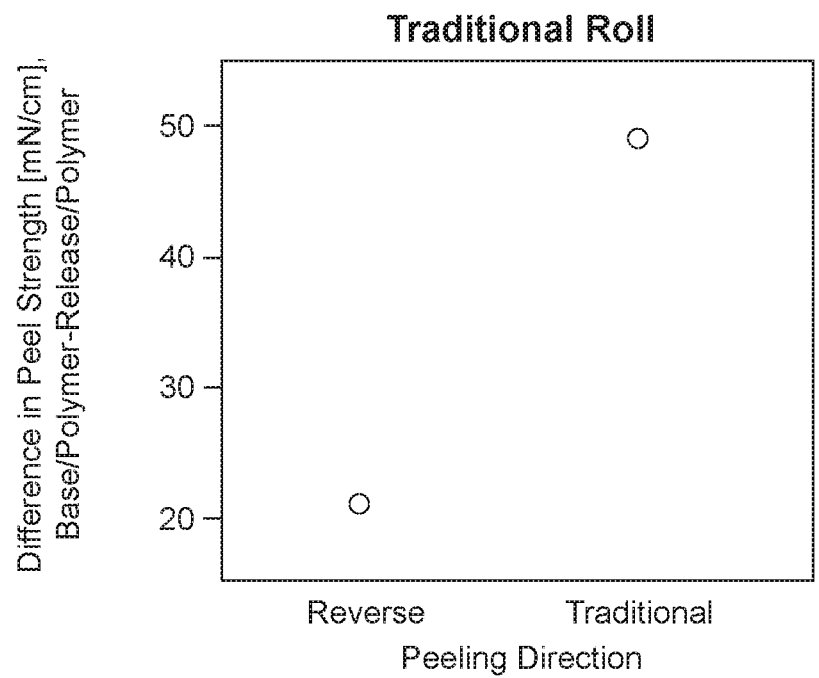

Effectively, the peel depicted in FIG. 6A simulates the delamination for a traditional roll during unwinding; the peel depicted in FIG. 7A simulates the delamination for a reverse roll during unwinding; the peel depicted in FIG. 6B simulates absence of delamination for a traditional roll during unwinding; and the peel depicted in FIG. 7B simulates absence of delamination for a reverse roll during unwinding. The difference in peel strengths between the polymer/base layer interface and the polymer/release film interface is related to the probability of delamination. For example, the larger the difference in peel strengths between the polymer/base layer interface and the polymer/release film interface, the less likely it is that polymer layer will stay adhered to the release film side of the original layer onto which it was coated and the more likely it is that polymer layer will stay adhered to the base layer side of the adjacent layer resulting in delamination. As can be seen in FIGS. 8A and 8B, the reverse peeling geometry reduced the difference in peel strengths of the polymer layer from the base layer side and the release film side, thus reducing the probability of delamination. The traditional peeling geometry demonstrates larger difference in peel strengths of the polymer layer from the base layer side and the release film side, thus increasing the probability of delamination The data shown in FIGS. 8A and 8B demonstrates that if the laminated material obtained from the traditional roll would have been wounded in a reverse manner it would have had lower risk of delamination occurring during the unwinding of such roll as compared to the situation when the laminated material obtained from the traditional roll is wounded in a traditional manner.

Example 2 (Reverse Roll Construction)

A 150 meter long web of 11.5 μm GORE-SELECT® (manufactured by W. L. Gore & Associates, Co., Ltd, Japan) was wound into a reverse roll construction in accordance with aspects of the present invention. For example, a first end of the laminated material was fed to an outer surface of the core of a roller that was rotating in a clockwise or counterclockwise direction such that (i) a first layer of the laminated material wound around the core comprises the inner surface of the base layer of the first layer contacting an outer surface of the core, (ii) a second layer of the laminated material wound around the first layer comprises the inner surface of the base layer of the second layer contacting the outer surface of the ion-exchange resin layer from the first layer, and (iii) a third layer of the laminated material wound around the second layer comprises the inner surface of the base layer of the third layer contacting the outer surface of the polymer layer from the second layer. This reverse roll construction was subjected to storage in an oven at 90° C. for 24 hours. Thereafter, the reverse roll construction was cooled to room temperature, and sheets made of multiple layers of GORE-SELECT® (manufactured by W. L. Gore & Associates, Co., Ltd, Japan) on a backer film were processed in accordance with the peel test procedure 500 described herein with respect to FIG. 5.

The 90 degree peel strength test at a first interface (between the outer surface of the polymer layer of the first layer and the inners surface of the base layer of the second layer) and a second interface (between the inner surface of the polymer layer of the second layer and an outer surface of the release film of the second layer) was measured for traditional and reverse peel geometries. The peel strengths at the interfaces of interest were measured for the sheets that comprise multiple layers (A, B, C) of laminated material cut out from the above described reverse roll simulating the peel geometries that would be observed for traditional and reverse roll as depicted in FIGS. 6A, 6B, 7A, and 7B. These simulations of peel at interfaces of interest as they would be observed in traditional and reverse roll were performed on the samples cut from the same sheet obtained from the above described reverse roll in order to eliminate any potential differences between rolls (influence of their aging history or manufacturing nuances on peel strength) and to demonstrate the beneficial effect of peel geometry inherently observed during reverse roll unwinding on decreasing the likelihood of delamination As shown in FIG. 6A, simulating unwind of the traditional roll construction, the polymer layer of the second layer (B) stayed adhered to the base layer side of the adjacent first layer (A) and was peeled from the release film side of the second layer (B). The peel test performed according to FIG. 6A tests the peel strength between polymer layer and the release film of the second layer (B) as it would be observed during the unwind of traditional roll, i.e. "traditional" peel direction for polymer/release film interface. As shown in FIG. 6B, simulating unwind of the traditional roll construction, the polymer layer of the second layer (B) stayed adhered to the release film side of the second layer (B) and was peeled from the base layer side of the adjacent first layer (A). The peel test performed according to FIG. 6B tested the peel strength between the polymer layer and the base layer of adjacent layers (A and B) as it would be observed during the unwind of traditional roll, i.e. "traditional" peel direction for polymer/base layer interface. As shown in FIG. 7A, simulating unwind of the reverse roll construction, the polymer layer of the first layer (A) stayed adhered to the base layer side of the adjacent second layer (B) and was peeled from the release film side of the first layer (A). The peel test performed according to FIG. 7A tested the peel strength between the polymer layer and the release film of the first layer (A) as it would be observed during the unwind of a reverse roll, i.e. "reverse" peel direction for polymer/release film interface. As shown in FIG. 7B, simulating unwind of the reverse roll construction, the polymer layer of the first layer (A) stayed adhered to the release film side of the first layer (A) and was peeled from the base layer side of the adjacent second layer (B). The peel test performed according to FIG. 7B tested the peel strength between the polymer layer and the base layer of adjacent layers (A and B) as it would be observed during the unwind of reverse roll, i.e. "reverse" peel direction for polymer/base layer interface.

Figure 9A:
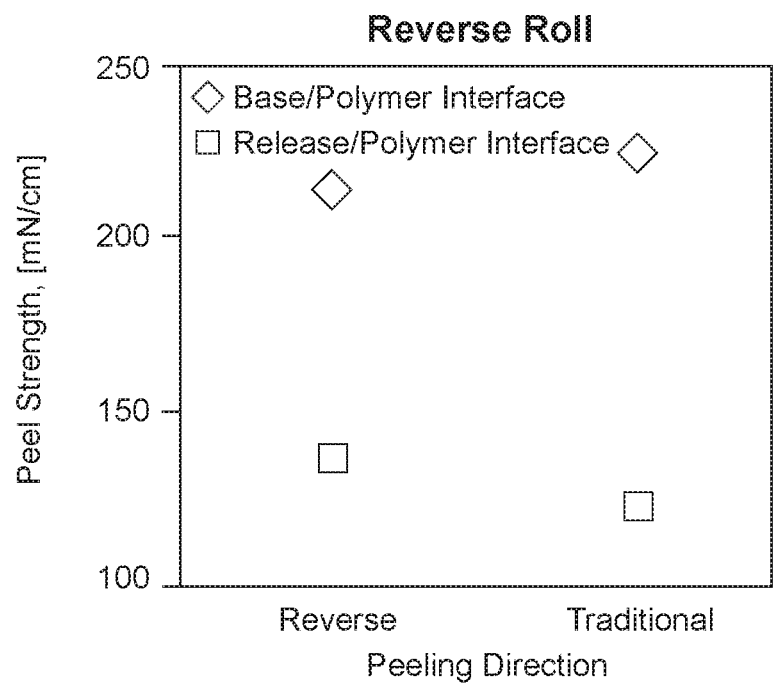
FIGS. 9A and 9B show peel strength data for a reverse roll construction in accordance with some aspects of the invention.
Figure 9B:
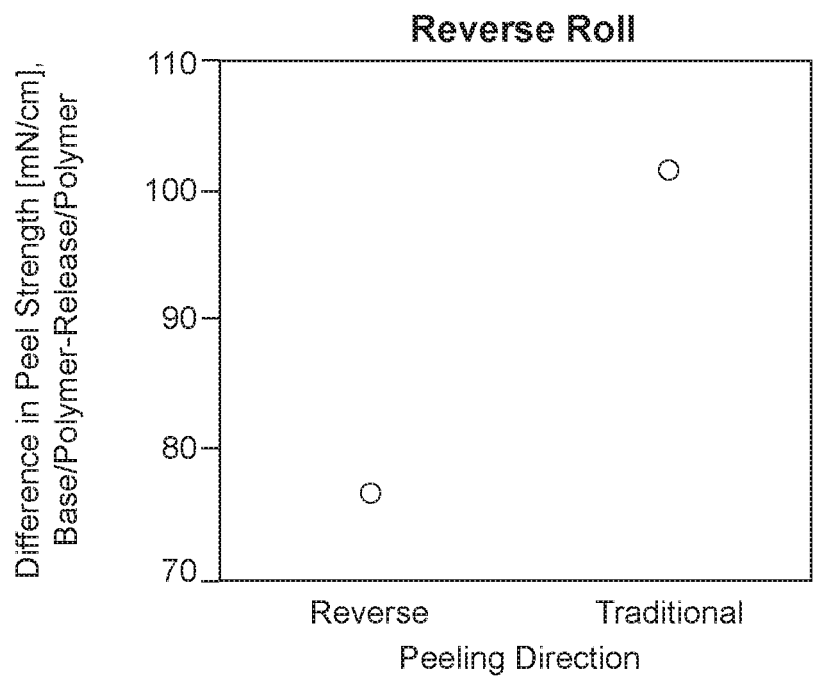

Effectively, the peel depicted in FIG. 6A simulates the delamination for a traditional roll during unwinding; the peel depicted in FIG. 7A simulates the delamination for a reverse roll during unwinding; the peel depicted in FIG. 6B simulates absence of delamination for a traditional roll during unwinding; and the peel depicted in FIG. 7B simulates absence of delamination for a reverse roll during unwinding. The difference in peel strengths between the polymer/base layer interface and polymer/release film interface is related to the probability of delamination. For example, the larger the difference in peel strengths between the polymer/base layer interface and the polymer/release film interface, the less likely it is that polymer layer will stay adhered to the release film side of the original layer onto which it was coated and the more likely it is that polymer layer will stay adhered to the base layer side of the adjacent layer resulting in delamination. As can be seen in FIGS. 9A and 9B, the reverse peeling geometry reduced the difference in peel strengths of the polymer layer from the base layer side and the release film side, thus reducing the probability of delamination. The traditional peeling geometry demonstrates larger difference in peel strengths of the polymer layer from the base layer side and the release film side, thus increasing the probability of delamination. The data shown in FIGS. 9A and 9B demonstrates that if the laminated material obtained from the reverse roll is wounded in a reverse manner it has lower risk of delamination occurring during the unwinding of such roll as compared to the situation when the laminated material obtained from the reverse roll would have been wounded in a traditional manner.

Consequently, Examples 1 and 2 demonstrate that delamination is less probable when the roll that is being unwound has reverse construction, meaning that a roll has layer directionality of the polymer layer, the release film, and the base layer when looking from the outside of the roll construction towards the core of the roll construction, e.g., the polymer layer is on the outer surface of the backer film. The peel strength at the base layer/polymer layer interface observed during unwinding of a roll with such reverse construction is low and the peel strength at the release film/polymer layer interface is high, i.e., the difference between the base layer/polymer layer interface peel strength and the release film/polymer layer interface is lowered compared to the traditional construction.

While the invention has been described in detail, modifications within the spirit and scope of the invention will be readily apparent to the skilled artisan. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by the skilled artisan. Furthermore, the skilled artisan will appreciate that the foregoing description is by way of example only, and is not intended to limit the invention.

What is claimed is:

1. A roll of laminated material prepared by a process comprising the steps of:
   providing the laminated material comprising an ion-exchange resin layer, a release film, and a base layer; and
   feeding the laminated material to a roller to generate the roll of the laminated material comprising a plurality of layers of the laminated material wound around a core, wherein each layer comprises the ion-exchange resin layer having inner and outer surfaces, the release film having inner and outer surfaces, the outer surface of the release film being bonded to the inner surface of the ion-exchange resin layer, and the base layer having inner and outer surfaces, the outer surface of the base layer being bonded to the inner surface of the release film,
   wherein the laminated material is fed to the roller such that (i) a first layer of the laminated material wound around the core comprises the inner surface of the base layer of the first layer contacting an outer surface of the core, and (ii) a second layer of the laminated material wound around the first layer comprises the inner surface of the base layer of the second layer contacting the outer surface of the ion-exchange resin layer from the first layer.

2. The roll of laminated material of claim 1, wherein the release film comprises a cycloolefinic copolymer.

3. The roll of laminated material of claim 1, wherein the ion-exchange resin layer comprises an ion exchange material and a fluorine-containing polymer having a sulfonic acid group, a carboxyl group, a phosphoric acid group, or a phosphone group.

4. The roll of laminated material of claim 1, the ion-exchange resin layer comprises an ion exchange material and (i) polytetrafluoroethylene or (ii) expanded polytetrafluoroethylene.

5. The roll of laminated material of claim 1, wherein the base layer comprises a material selected from the group consisting of polyester, polycarbonate, triacetyl cellulose, polyamide, aromatic polyamide, polyimide, polyetherimide, polyphenylene sulfide, polysulfone, polyethersulfone, polypropylene, and combinations thereof.

6. The roll of laminated material of claim 1, wherein the base layer comprises a polyester selected from the group consisting of polyethylene terephthalate (PET), polyethylene naphthalate (PEN), and polypropylene (PP).

7. A process for manufacturing a roll of laminated material comprising the steps of:
   binding a fluorine-containing polymer to a backer film comprising a release film and a base layer;
   coating the fluorine-containing polymer with an ion exchange material to create an ion-exchange resin layer;
   heating the ion-exchange resin layer and the backer film to create the laminated material; and
   feeding the laminated material to a roller to generate the roll of the laminated material comprising a plurality of layers of the laminated material wound around a core, wherein each layer comprises the ion-exchange resin layer having inner and outer surfaces, the release film having inner and outer surfaces, the outer surface of the release film being bonded to the inner surface of the ion-exchange resin layer, and the base layer having inner and outer surfaces, the outer surface of the base layer being bonded to the inner surface of the release film,
   wherein the laminated material is fed to the roller such that (i) a first layer of the laminated material wound around the core comprises the inner surface of the base layer of the first layer contacting an outer surface of the core, and (ii) a second layer of the laminated material wound around the first layer comprises the inner surface of the base layer of the second layer contacting the outer surface of the ion-exchange resin layer from the first layer.

8. The process of claim 7, wherein the laminated material is fed to the roller while maintaining a line speed of about 1.5 to 50.0 m/min.

9. The process of claim 7, wherein the laminated material is fed to the roller while maintaining a line tension of about 100 N to 300 N.

10. The process as in claim 7, the release film comprises a cycloolefinic copolymer.

11. The process as in claim 7, the fluorine-containing polymer has a sulfonic acid group, a carboxyl group, a phosphoric acid group, or a phosphone group.

12. The process as in claim 7, wherein the fluorine-containing polymer is (i) polytetrafluoroethylene or (ii) expanded polytetrafluoroethylene.

13. The process as in claim 7, wherein the base layer comprises a material selected from the group consisting of polyester, polycarbonate, triacetyl cellulose, polyamide, aromatic polyamide, polyimide, polyetherimide, polyphenylene sulfide, polysulfone, polyethersulfone, polypropylene, and combinations thereof.

14. The process as in claim 7, the base layer comprises a polyester selected from the group consisting of polyethylene terephthalate (PET), polyethylene naphthalate (PEN), and polypropylene (PP).

15. A roll of laminated material, the roll comprising:
   a plurality of layers of the laminated material wound around a core, each layer comprising:
      an ion-exchange resin layer having inner and outer surfaces;
      a release film having inner and outer surfaces, the outer surface of the release film being bonded to the inner surface of the ion-exchange resin layer; and
      a base layer having inner and outer surfaces, the outer surface of the base layer being bonded to the inner surface of the release film,
   wherein a first layer of the plurality of layers comprises the inner surface of the base layer contacting an outer surface of the core and a second layer of the plurality of layers comprises the inner surface of the base layer contacting the outer surface of the ion-exchange resin layer from the first layer.

16. The roll of laminated material of claim 15, the release film comprises a cycloolefinic copolymer.

17. The roll of laminated material as in claim 15, wherein the ion-exchange resin layer comprises an ion exchange material and a fluorine-containing polymer having a sulfonic acid group, a carboxyl group, a phosphoric acid group, or a phosphone group.

18. The roll of laminated material as in claim 15, wherein the ion-exchange resin layer comprises an ion exchange material and (i) polytetrafluoroethylene or (ii) expanded polytetrafluoroethylene.

19. The roll of laminated material as in claim 15, wherein the base layer comprises a material selected from the group consisting of polyester, polycarbonate, triacetyl cellulose, polyamide, aromatic polyamide, polyimide, polyetherimide, polyphenylene sulfide, polysulfone, polyethersulfone, polypropylene, and combinations thereof.

20. The roll of laminated material as in claim 19, wherein the base layer comprises a polyester selected from the group consisting of polyethylene terephthalate (PET), polyethylene naphthalate (PEN), and polypropylene (PP).

* * * * *